(12) United States Patent
Sidor et al.

(10) Patent No.: US 7,482,575 B2
(45) Date of Patent: Jan. 27, 2009

(54) ROTARY OPTICAL ENCODER EMPLOYING MULTIPLE SUBENCODERS WITH COMMON RETICLE SUBSTRATE

(75) Inventors: Kurt Sidor, Plaistow, NH (US); Keith M. Hinrichs, Natick, MA (US)

(73) Assignee: GSI Group Corporation, Billerica, MA (US)

( * ) Notice: Subject to any disclaimer, the term of this patent is extended or adjusted under 35 U.S.C. 154(b) by 0 days.

(21) Appl. No.: 11/832,804

(22) Filed: Aug. 2, 2007

(65) Prior Publication Data

US 2008/0042051 A1 Feb. 21, 2008

Related U.S. Application Data

(60) Provisional application No. 60/839,100, filed on Aug. 21, 2006.

(51) Int. Cl.
*G01D 5/34* (2006.01)
(52) U.S. Cl. .............................. 250/231.13; 250/237 R
(58) Field of Classification Search ............ 250/231.13, 250/231.14, 231.15, 231.16, 237 R, 221; 341/11, 13; 356/373–375
See application file for complete search history.

(56) References Cited

U.S. PATENT DOCUMENTS

| | | | |
|---|---|---|---|
| 3,096,444 A | 7/1963 | Seward | |
| 3,549,897 A | 12/1970 | Blake | |
| 3,768,911 A | 10/1973 | Erickson | |
| 4,039,826 A | 8/1977 | Wingate | |
| 4,123,750 A | 10/1978 | Leney et al. | |
| 4,340,814 A | 7/1982 | DiCiaccio et al. | |
| 4,429,267 A * | 1/1984 | Veale | 318/594 |
| 4,631,520 A | 12/1986 | Wingate | |
| 4,906,992 A | 3/1990 | Wingate et al. | |
| 4,912,468 A | 3/1990 | Rust | |
| 4,947,166 A | 8/1990 | Wingate et al. | |
| 5,079,549 A | 1/1992 | Liessner | |
| 5,129,725 A * | 7/1992 | Ishizuka et al. | 356/617 |
| 5,252,825 A * | 10/1993 | Imai et al. | 250/231.18 |

(Continued)

OTHER PUBLICATIONS

DRC LDX Encoder Schematic, 2001.

(Continued)

*Primary Examiner*—Que T Le
(74) *Attorney, Agent, or Firm*—BainwoodHuang

(57) ABSTRACT

A rotary optical position encoder for detecting angular position includes a light source, a monolithic scale disk including an optical scale pattern, a monolithic reticle substrate including sets of reticle aperture patterns between the light source and the scale disk, detection and conversion circuitry, and digital processing circuitry. The light source, scale disk, reticle substrate, and detection and conversion circuitry form a plurality of optical sub-encoders at angular positions about the rotational axis, each sub-encoder having an optical path extending from the light source to the detection and conversion circuitry via a respective set of reticle aperture patterns and the optical scale pattern. The digital processing circuitry is operative to combine digital position output values of the sub-encoders to generate an encoder position output value. The optical sub-encoders can include incremental position encoders that provide high-resolution position indications with improved thermally stability due to the use of a shared reticle substrate. Additional optical sub-encoders provide zero-reference or "index" indications as well as a coarse absolute position.

28 Claims, 8 Drawing Sheets

U.S. PATENT DOCUMENTS

| | | |
|---|---|---|
| 5,430,537 A | 7/1995 | Liessner et al. |
| 5,671,043 A | 9/1997 | Ivers |
| 5,844,673 A | 12/1998 | Ivers |
| 5,939,879 A | 8/1999 | Wingate et al. |
| 6,211,639 B1 | 4/2001 | Meister et al. |
| 6,297,750 B1 | 10/2001 | Wingate et al. |
| 6,639,207 B2 | 10/2003 | Yamamoto et al. |
| 6,642,507 B1 | 11/2003 | Kataoka |
| 6,817,528 B2 | 11/2004 | Chen |
| 7,051,450 B2 | 5/2006 | Raab et al. |
| 7,069,664 B2 | 7/2006 | Raab et al. |
| 2004/0036016 A1 | 2/2004 | Homer et al. |

OTHER PUBLICATIONS

DRC-35 High Performance Optical Shaft Angle Encoder, undated.

"The Moire Technique for Displacement Measurement," 1991.

\* cited by examiner

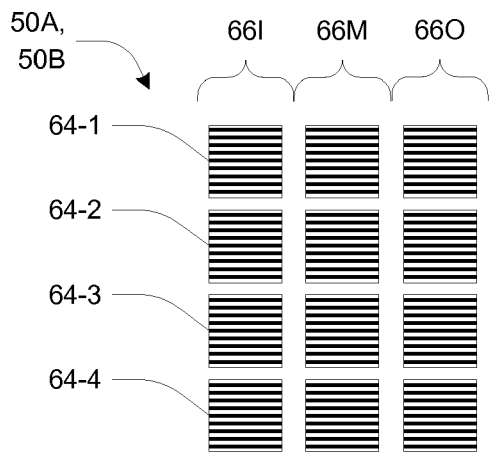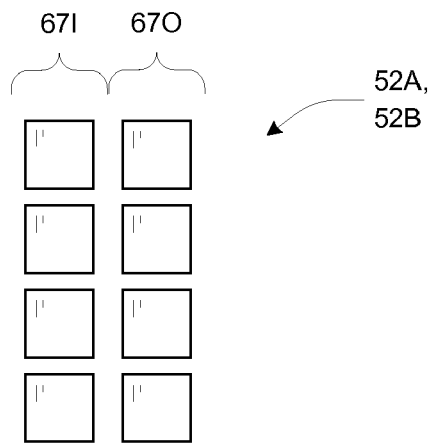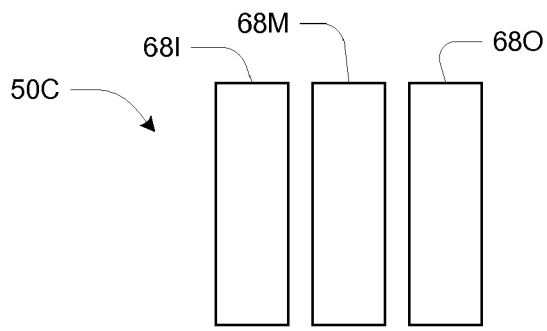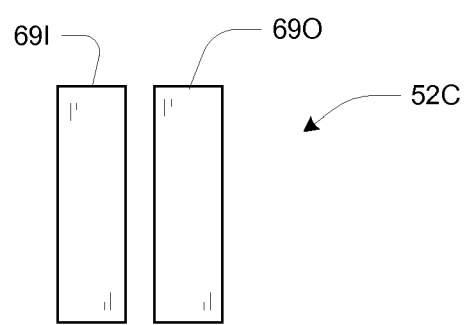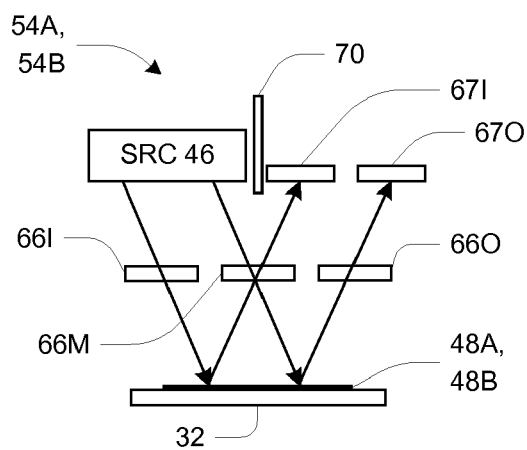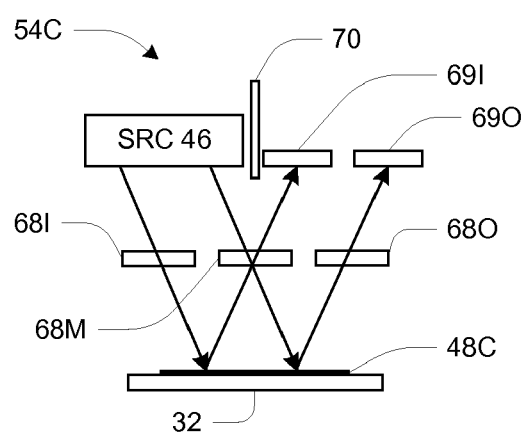

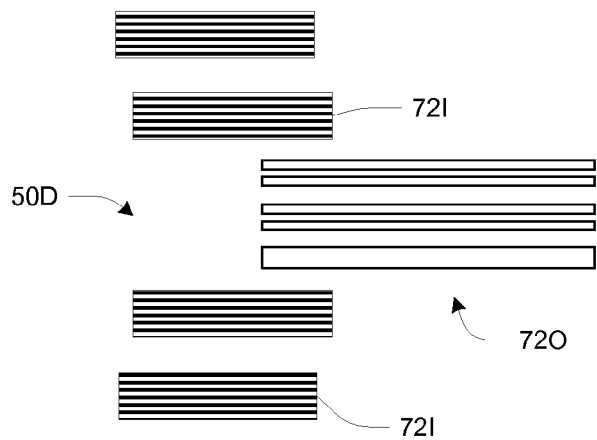 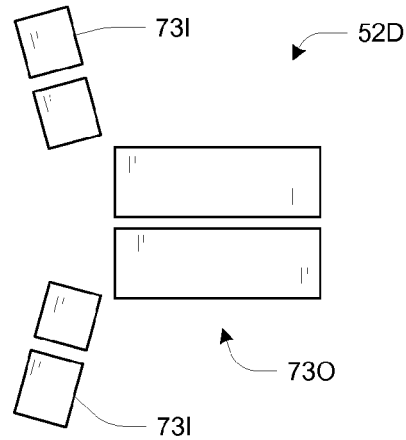
Fig. 13  Fig. 14
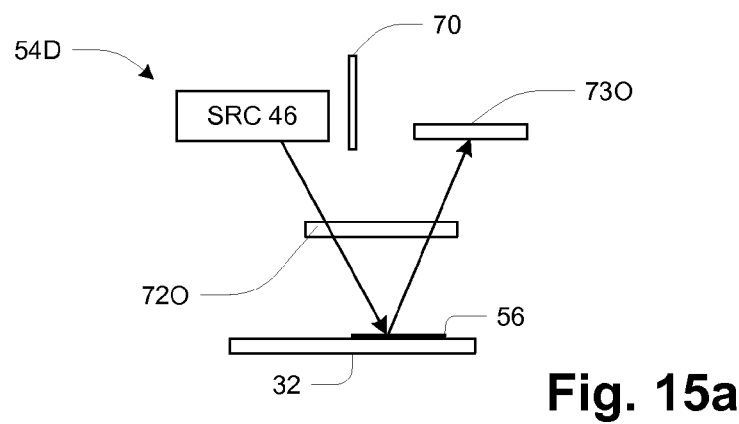
Fig. 15a
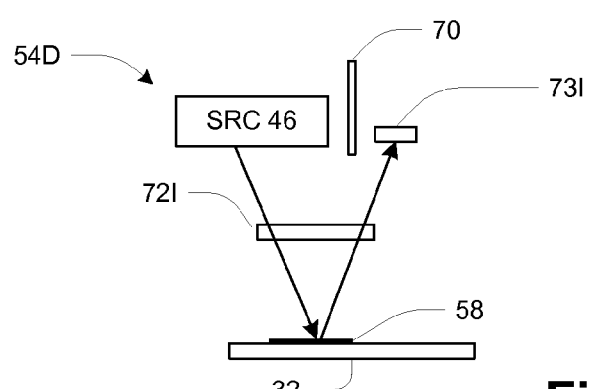
Fig. 15b

ROTARY OPTICAL ENCODER EMPLOYING MULTIPLE SUBENCODERS WITH COMMON RETICLE SUBSTRATE

BACKGROUND

The present invention is related to the field of rotary optical encoders used to sense the rotational position of rotatable objects such as servo motors.

Position feedback is needed for closed loop control of the rotational position of motors including reciprocating motors. A variety of position sensor technologies have been employed, including optical position detectors which operate by modulating light in some manner as a function of rotational position and converting the detected modulation into corresponding angular position values. In motor applications, optical position detectors are commonly located at one axial end of the rotatable shaft of the motor. A component such as a patterned reflective disk may be coupled to the end of the rotatable shaft, and adjacent encoder elements operate to generate a light signal and detect light reflected from the disk. The modulation may be accomplished, for example, by employing a pattern of reflective and non-reflective areas on the disk such that the pattern of reflected light is indicative of the rotational position of the disk and therefore also of the motor shaft.

One problem experienced with optical position detectors according to the above arrangement is a certain type of inaccuracy resulting from eccentric motion or "wobbling" of the motor shaft as it rotates (also referred to as radial run-out) or from improper radial alignment of the reflective disk and the shaft. The eccentric motion of the disk imparts an eccentric component to the reflected light pattern. Part of this eccentric component is incorrectly perceived by the optical position detector as shaft rotation, and thus the output of the optical position detector includes a spatially periodic error component.

It has been known to address the problem of eccentricity-induced error by employing a pair of optical position detectors at diametrically opposite positions of the encoder disk (i.e., separated by 180 degrees). The analog outputs of the optical position detectors are summed such that the effect of eccentricity within a certain range is completely cancelled. While this configuration can effectively eliminate eccentricity errors, it still suffers from two drawbacks. First, differential motion between the optical position detectors in a direction perpendicular to the diameter line between them is perceived as rotary motion. Such relative motion can occur if the mounting structure or the components of the position detectors move in response to temperature changes. The second disadvantage is difficulty in aligning the position detector. The two separate position detectors must be aligned so that corresponding analog output signals are in phase with each other, otherwise the modulation of the summed signals is diminished. A low modulation signal reduces the signal-to-noise ratio and limits the interpolated resolution of the position detector.

SUMMARY

To overcome the deficiencies of the prior art as discussed above, a rotary optical encoder is disclosed that employs multiple optical sub-encoders that utilize a shared monolithic reticle substrate. Respective reticle aperture patterns formed on the reticle substrate are responsible for creating light patterns at respective positions incident on a rotating scale disk. Because the reticle aperture patterns for the sub-encoders are on the same reticle substrate, temperature-induced differential effects are reduced, thus increasing overall encoder accuracy.

The disclosed rotary optical position encoder includes a light source, a monolithic scale disk including an optical scale pattern, a monolithic reticle substrate including sets of reticle aperture patterns between the light source and the scale disk, detectors, and conversion and digital processing circuitry. The light source, scale disk, reticle substrate, and detection and conversion circuitry form a plurality of optical sub-encoders at angular positions about a rotational axis, each sub-encoder having an optical path extending from the light source to the detection and conversion circuitry via a respective set of reticle aperture patterns and the optical scale pattern. The digital processing circuitry is operative to combine digital position output values of the sub-encoders to generate an encoder position output value. The optical sub-encoders may include incremental position encoders whose outputs are combined to provide high-resolution position indications with improved thermally stability due to the use of a shared reticle substrate. Additional optical sub-encoders may be utilized to provide zero-reference or "index" indications as well as a coarse absolute position indication for initial movement of the motor shaft.

In one class of embodiments, the encoder may be used to sense the rotational position of a reciprocating shaft having a range of rotation less than one-half of a complete revolution, such as used for example as part of so-called "galvos" (galvanometers) used to steer laser beams in laser systems. The optical sub-encoders are incremental position sub-encoders. The optical pattern includes two scale portions on diametrically opposite sides of the scale disk, and the scale disk further includes an optical position reference pattern between the two scale portions. The optical position encoder further includes a reference optical sub-encoder between the incremental optical sub-encoders. The reference optical sub-encoder includes a reference reticle aperture pattern formed on the reticle substrate along an optical path of the reference optical sub-encoder between the light source assembly and the optical position reference pattern of the scale disk. The optical position reference pattern may comprise a zero-reference pattern at a location corresponding to a zero-reference or "index" position of the rotatable shaft, used with a corresponding zero-reference reticle aperture pattern of the reticle substrate. The optical position reference pattern may alternatively comprise a coarse absolute position pattern configured to provide a coarse indication of the absolute position of the rotatable shaft. In yet another embodiment, both a zero-reference optical sub-encoder and a coarse absolute position sub-encoder may be employed, in which case it may be advantageous to locate them at diametrically opposite positions at a ¼-rotation offset from the incremental position sub-encoders.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 7 is a diagram of a set of reticle aperture patterns forming part of each of the incremental position sub-encoders of FIG. 4;

FIG. 9 is a diagram of a set of detector elements forming part of each of the incremental position sub-encoders of FIG. 4;

FIG. 10 is a diagram of a set of reticle aperture patterns forming part of the coarse absolute position sub-encoder of FIG. 4;

FIG. 11 is a diagram of a set of detector elements forming part of the coarse absolute position sub-encoder of FIG. 4;

FIG. 12 (consisting of FIGS. 12a and 12b) is a schematic side view illustrating optical paths for the incremental and coarse absolute sub-encoders of FIG. 4;

FIG. 13 is a diagram of a zero-reference reticle aperture pattern forming part of the zero-reference optical sub-encoder of FIG. 4;

FIG. 14 is a diagram of optical detector elements for the zero-reference optical sub-encoder of FIG. 4;

FIG. 15 (consisting of FIGS. 15a and 15b) is a schematic side view illustrating optical paths in the zero-reference optical sub-encoder of FIG. 4;

DETAILED DESCRIPTION

Embodiments of the invention are directed to rotary optical position encoders used in applications such as precision control of servo motors, in which high accuracy in position sensing is desirable. The disclosed rotary optical position encoder includes features that improve accuracy by use of multiple optical sub-encoders located at different angular positions about a motor shaft or other rotating object whose rotational position is being tracked. The optical sub-encoders employ respective reticle aperture patterns on a shared monolithic reticle substrate, which reduces errors associated with temperature-induced differential movement of encoder components.

Figure 1:
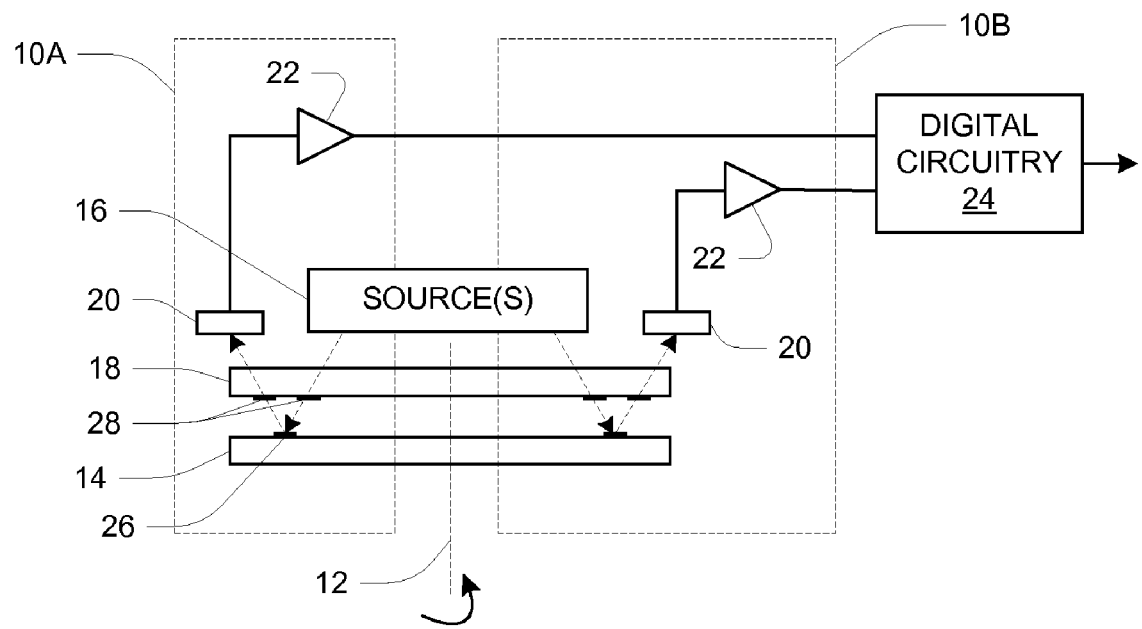
FIG. 1 is a schematic side view of a rotary optical position encoder in accordance with the present invention.

FIG. 1 shows a schematic side view of a such a rotary optical position encoder. The rotary optical position encoder includes multiple position sub-encoders 10 (shown as 10A and 10B) located at respective angular positions about an axis of rotation 12. The sub-encoders 10 are formed by a configuration of elements including a scale disk 14, a light source 16, a monolithic reticle substrate 18, optical detectors 20, analog circuitry 22, and digital circuitry 24. The scale disk 14, reticle substrate 18, and digital circuitry 24 are shared among the sub-encoders 10, whereas individual detectors 20 and components of the analog circuitry 22 are specific to a sub-encoder 10. The light source 16 may be a single source generating light for all sub-encoders 10, or it may include respective sub-sources for each of the sub-encoders 10. Examples of light sources include light-emitting diodes, semiconductor lasers, quantum devices, incandescent sources, and fluorescent sources.

The scale disk 12 has scale optical patterns 26 formed thereon so as to reflect light from the source 16 in a corresponding pattern. This may be accomplished by using reflective pattern elements formed on a non-reflective surface portion of the scale disk 14, for example. The reticle substrate 18 includes sets of reticle aperture patterns 28 that provide for patterned transmission of light therethrough, as described in more detail below. The optical detectors 20 receive light reflected from the scale disk 12 through the reticle aperture patterns 28. Thus each sub-encoder 10 has its own optical path extending from the light source 16 (shared or individual) to a respective optical detector 20 via a respective set of reticle aperture patterns 28 of the reticle substrate 18 and scale optical patterns 26 of the scale disk 14. While FIG. 1 shows only two sub-encoders 10A and 10B, in general there may be any number of sub-encoders arranged about the axis 12.

Figure 2:
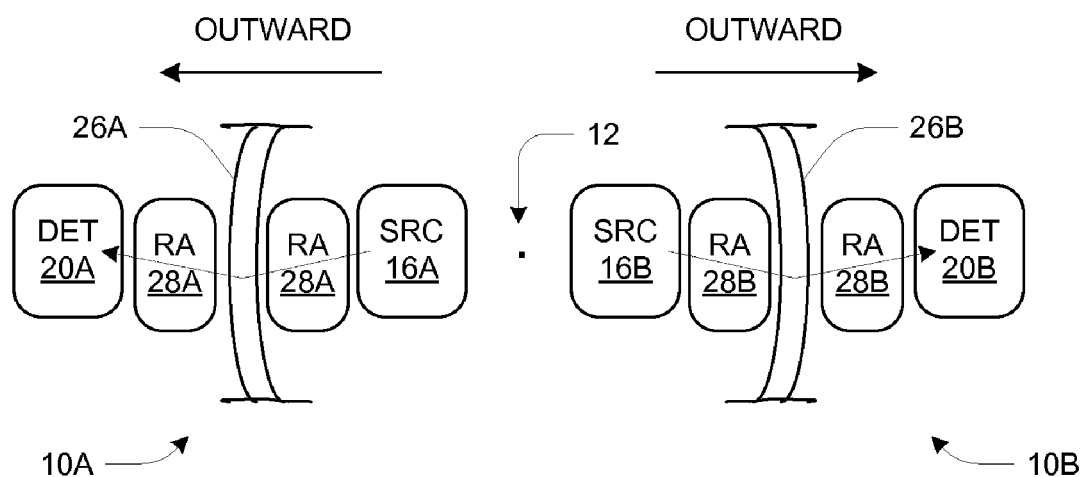
FIG. 2 is a schematic end view of the rotary optical position encoder of FIG. 1.

FIG. 2 is a schematic top or end view of the optical encoder of FIG. 1. In the illustrated configuration, the two sub-encoders 10A and 10B are located diametrically opposite each other (i.e., separated by 180 degrees about the axis 12). Each sub-encoder 10 includes a respective source (SRC) 16, set of reticle aperture patterns (RA) 28, scale optical pattern 26, and optical detector (DET) 20 arranged in a direction extending radially outwardly. As mentioned above, the sources 16A and 16B may actually constitute a single shared source 16. Also, the scale optical patterns 26A and 26B may constitute a single scale optical pattern such as an arcuate diffraction grating extending around the entire scale disk 14. The two sub-encoders 10A and 10B are utilized to generate separate position indications, which are then digitally combined as described below for better accuracy than is generally provided by either sub-encoder 10 alone. The outputs from the sub-encoders 10 may be used by a separate system element to control the angular position of the rotating object. Specific examples of such use are provided below.

Figure 3:
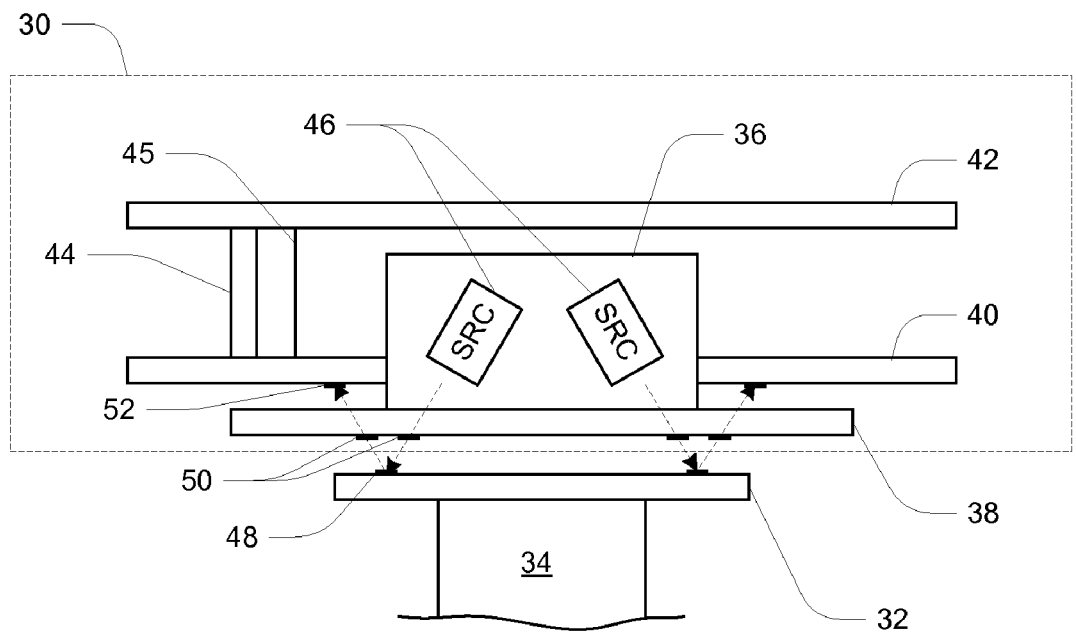
FIG. 3 is a schematic side view of an implementation of the rotary optical position encoder of FIG. 1.

FIG. 3 shows a schematic side view of a rotary optical position encoder according to an implementation of the encoder of FIG. 1, as may be used in an application as part of a servo motor assembly. The rotary optical position encoder includes an optical encoder head assembly 30 and a scale disk 32 attached to a rotating object, such as a rotatable shaft 34 of a servo-controlled motor. In the illustrated embodiment, the optical encoder head assembly 30 includes a light source assembly 36 mounted to a reticle substrate 38, an analog circuit board 40 surrounding the light source assembly 36, and a digital circuit board 42 separated from the analog circuit board 40 via standoffs 44 and an electrical interconnect 45. The light source assembly 36 includes one or more light sources (SRC) 46 such as described above with reference to FIG. 1. The scale disk 32 has scale optical patterns 48 formed thereon so as to reflect light from a source 46 in a corresponding pattern. This may be accomplished by using reflective pattern elements formed on a non-reflective surface portion of the scale disk 32, for example. The reticle substrate 38 includes sets of aperture patterns 50 that provide for patterned transmission of light therethrough, as described in more detail below. The analog circuit board 40 includes, among other things, optical detectors 52 that receive light reflected from the scale disk 32. Illustrated in FIG. 3 are two separate optical sub-encoders each having its own optical path extending from a respective light source 46 to a respective optical detector 52 via a respective set of reticle aperture patterns 50 of the reticle substrate 38 and scale optical patterns 48 of the scale disk 32. In the illustrated embodiment, the two optical sub-encoders of FIG. 3 are part of a total of four optical sub-encoders, as described in more detail below.

Figure 4:
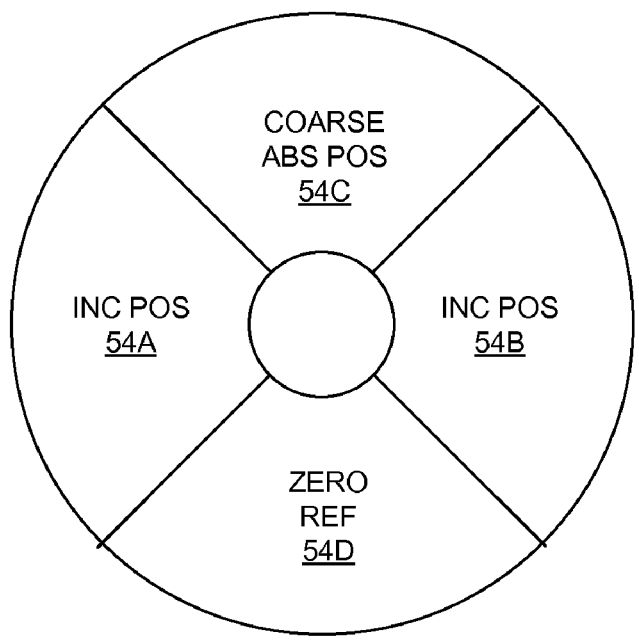
FIG. 4 is a schematic end view of the rotary optical position encoder of FIG. 3 showing two incremental position sub-encoders, a coarse absolute position sub-encoder, and a zero-reference sub-encoder.

FIG. 4 is a schematic top or end view of the optical encoder of FIG. 3. It includes four separate optical sub-encoders arranged in respective quadrants. In particular, two incremental position (INC POS) sub-encoders 54A, 54B are located diametrically opposite each other, and coarse absolute position (COARSE ABS POS) sub-encoder 54C and zero-reference (ZERO REF) sub-encoder 54D are located diametrically opposite each other along a line orthogonal to the line between the incremental position sub-encoders 54A and 54B. Each optical position sub-encoder 54 extends radially in the same manner shown in FIG. 2. The illustrated embodiment is particularly suitable for use in a servo motor application in which only limited rotation is possible, such as in a so-called "galvanometer" or "galvo" mirror assembly. Such galvos are used in various types of laser-based systems such as laser material processing systems and laser measurement/gauging systems, for example.

In the illustrated embodiment, rotation of the rotatable shaft 34 is limited to +/−45 mechanical degrees or less with respect to a zero-reference position. The two incremental position sub-encoders 54A and 54B are utilized to generate separate incremental position indications within this range of rotation, which are then digitally combined as described below for better accuracy than is generally provided by a single such sub-encoder. The zero-reference sub-encoder 54D is used to provide an indication of a particular predetermined angular position referred to as a "zero-reference" or "index" position (also referred to as a "home" position). The coarse absolute position sub-encoder 54C provides a coarse absolute position indication, which can be used during initialization for example to enable a controller to identify how to move toward the zero-reference position. The outputs from all of the sub-encoders 54 are used by a separate servo driver or controller to control the angular position of a system element attached to the rotatable shaft 34, such as the aforementioned laser-steering mirror.

Figure 5:
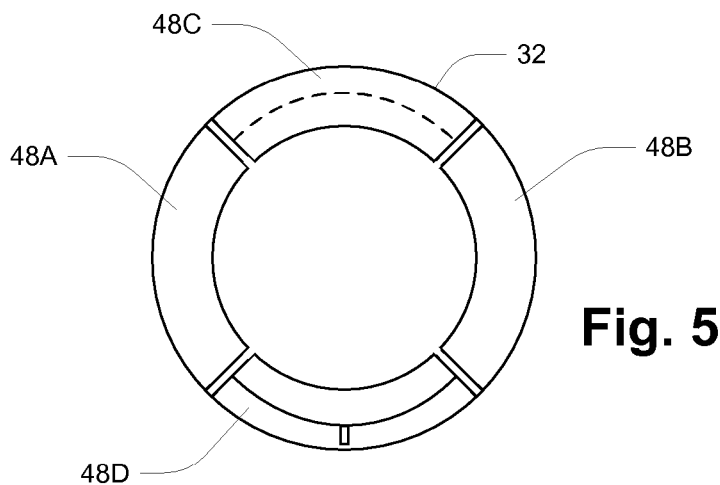
FIG. 5 is a schematic view of an optical scale disk in the rotary optical position encoder of FIG. 4.

FIG. 5 illustrates the configuration of the scale disk 32. Along its outer perimeter are arranged four reflective patterns 48A-48D. The patterns 48A and 48B are scale optical patterns including respective sets of spaced-apart lines forming fine-pitched diffraction gratings, as described in more detail below. Each of the scale optical patterns 48A and 48B forms part of the respective incremental position sub-encoder 54A and 54B, and each extends around substantially one-quarter of the circumference of the scale disk 32 to provide a fine-pitch incremental position indication in a range of about +/−45 mechanical degrees from a zero-reference position of the rotatable shaft 34. A zero-reference pattern 48D forms part of the zero-reference sub-encoder 54D and establishes the zero-reference or index position. A coarse absolute position pattern 48C forms part of the coarse absolute position sub-encoder 54C and establishes a coarse absolute position indication.

Figure 6:
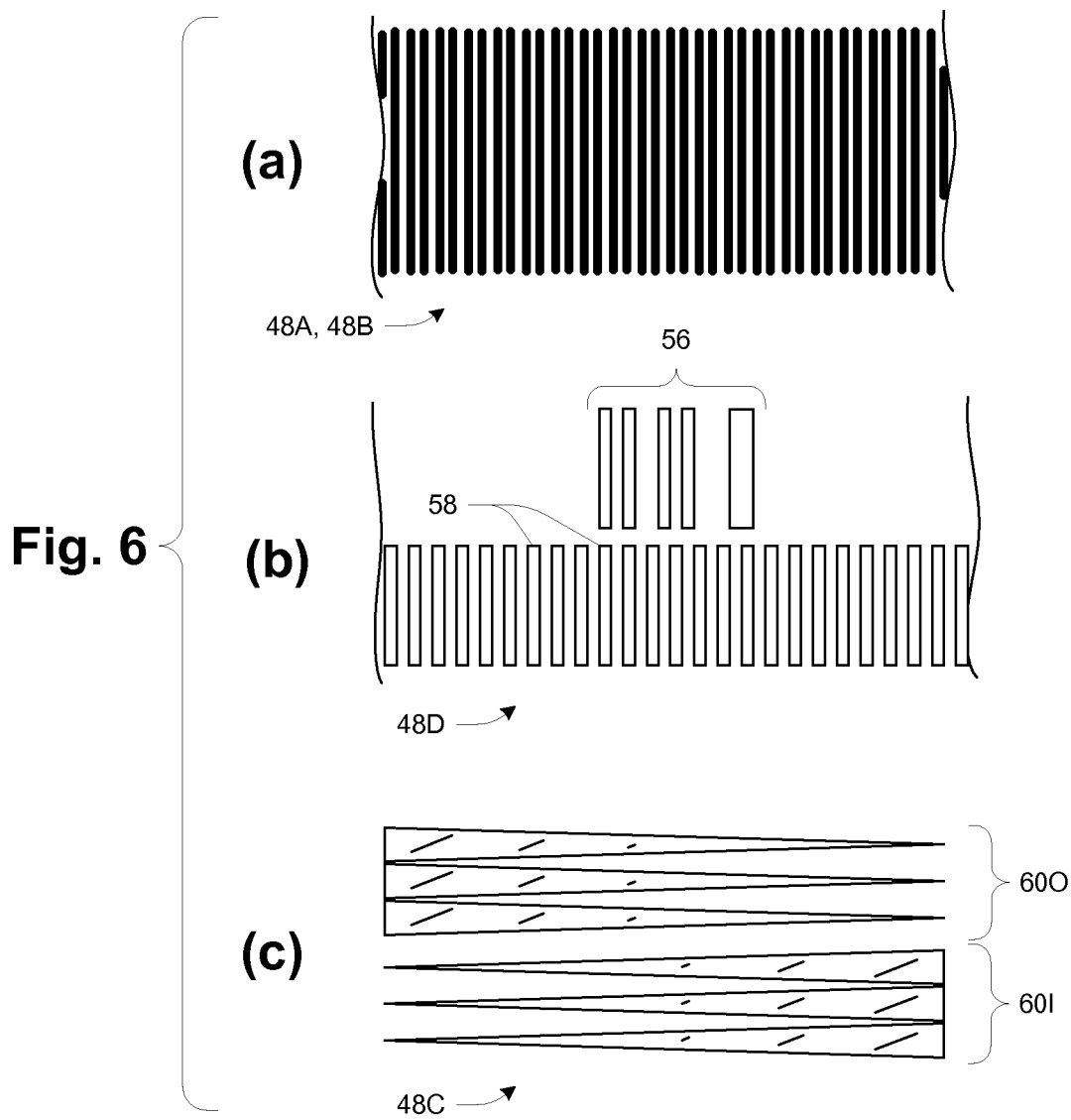
FIG. 6 (consisting of FIGS. 6(a), 6(b) and 6(c)) is a diagram of optical patterns formed on the optical scale disk of FIG. 5 including an incremental scale pattern, a zero-reference pattern and a coarse absolute scale pattern.

FIG. 6 illustrates the various scale optical patterns 48 in detail. FIG. 6(*a*) shows a portion of the diffraction grating scale patterns 48A, 48B. As indicated above, these include a number of finely spaced grating lines. In one embodiment, the lines may be 10 microns wide and spaced by 10 microns to yield a 20-micron pitch. Overall, each scale pattern 48A and 48B has an arcuate shape as shown in FIG. 5, with each line extending in a radial direction and the overall pattern extending across one-quarter of the circumference of the scale disk 32. Over a very small angular interval such as defined by the reticle aperture patterns 50 (described below), the lines of each scale pattern 48A and 48B are substantially parallel. Each scale pattern 48A and 48B operates in conjunction with the set of reticle aperture patterns 50 of the respective sub-encoder 54A, 54B as described below to produce position-dependent variations or modulation in the intensity of the light reaching the respective optical detector 52. The detectors 52 generate corresponding analog output signals that are processed by circuitry on the analog circuit board 40 and the digital circuit board 42 to generate digital signals. The digital signals are digitally combined to yield a position value indicative of the angular position of the rotatable shaft 34.

FIG. 6(*b*) shows the zero-reference pattern 48D. It includes an index pattern 56 and a coarse scale pattern 58. The index pattern 56 is utilized in an auto-correlative manner with the respective reticle aperture pattern to generate a signal having narrow pulse width and relatively high signal-to-noise ratio as the index pattern 56 moves past the index position. The coarse scale pattern 58 provides a coarse indication of incremental angular position. The signal generated by detection of the index pattern 56 is gated by a signal generated from the coarse scale pattern 58 to generate an overall zero-reference output signal that can be combined with position signals from the incremental position sub-encoders 54A, 54B to identify a precise zero-reference position of the rotatable shaft 34. In the illustrated embodiment, the zero-reference position is selected to be that position in which light from each source 16 strikes the middle of the angular range of each scale optical pattern 48.

FIG. 6(*c*) shows the coarse absolute pattern 48C. It consists of multiple triangular patterns elongated in the circumferential direction. In the illustrated embodiment, three radially outer patterns 600 are widest at a leftmost edge and come to a point at a rightmost edge, and three radially inner patterns 601 have the opposite orientation. It will be appreciated that the intensity of light reflected from each set of patterns 60 varies substantially linearly as a function of the angular position of the rotatable shaft 34. The outputs from respective optical detectors 52 for the patterns 60 are used in a differential manner to provide an indication of coarse absolute position. Specifically, if the outputs of two respective detectors for the patterns 600 and 601 are labeled A and B, then the coarse absolute position output signal can be formed as $(A-B)/(A+B)$. This value will be maximum positive at the leftmost edge of the patterns 60; maximum negative at the rightmost edge of the patterns 60; and zero at the midpoint (when A=B). If the midpoint is precisely aligned with the zero-reference position as indicated by the zero-reference sub-encoder 54D, then the polarity of the value $(A-B)/(A+B)$ indicates the direction away from the zero-reference position and the magnitude indicates the distance away. In practice, it may be necessary to perform a calibration procedure whereby the relationship between the mid-point of the patterns 60 and the zero-reference position as indicated by the zero-reference sub-encoder 54D is established, and then a corresponding adjustment or correction can be applied to the output of one or the other of the sub-encoders 54C or 54D. The coarse absolute position indication from the coarse absolute position sub-encoder 54C may be used, for example, by initialization logic to determine the direction and distance to rotate the rotatable shaft 34 to reach the zero-reference position from an arbitrary initial position.

FIG. 7 illustrates each of the sets of reticle aperture patterns 50A, 50B of the incremental position sub-encoders 54A, 54B (i.e., the structure depicted in FIG. 7 is repeated for each of the sub-encoders 54A and 54B). Each set of reticle aperture patterns 50A, 50B includes three reticle aperture patterns 66, shown as inner pattern 66I, middle pattern 66M, and outer pattern 66O. Within each of these patterns are included four reticle apertures 64, labeled 64-1 through 64-4 as shown. Each reticle aperture 64 is a set of spaced lines forming a diffraction grating. In one embodiment, the line spacing may be 17 microns for example. The grating may be formed as either a phase grating or an amplitude grating.

Before further description of the reticle apertures 64, the overall operation of the incremental position sub-encoders 54A, 54B is briefly described. Each of these sub-encoders is arranged as a polyphase position detector. Samples of light patterns reflected from the scale disk 32 are obtained at multiple locations corresponding to different spatial phases of the scale pattern, and these samples are combined according to a trigonometric relation to produce a single incremental position estimate. In particular, in the illustrated embodiment the incremental position sub-encoders 54A, 54B are four-phase encoders. Samples are obtained corresponding to spatial phases 0°, 90°, 180°, and 270° of an optical fringe period. These values can be labeled A, B, A– and B– and are taken to represent sin, cos, -sin, and -cos respectively of a phase angle θ corresponding to an intra-fringe position. The value of θ is calculated as $$\theta = \tan^{-1}\{[(A)-(A-)]/[(B)-(B-)]\}$$

Thus within each pattern 66 of reticle apertures 64, the relative spatial phase of each of the four reticle apertures 64 is selected according to an overall scheme by which a four-phase optical encoder is realized. There may be a variety of schemes employed. In the illustrated embodiment, the following scheme is used (A corresponds to 0° and B corresponds to 90°):

|  | Inner | Middle | Outer |
| --- | --- | --- | --- |
| 64-1 | B | A | B– |
| 64-2 | A | A | A– |
| 64-3 | A– | A | A |
| 64-4 | B– | A | B |

Figure 8:
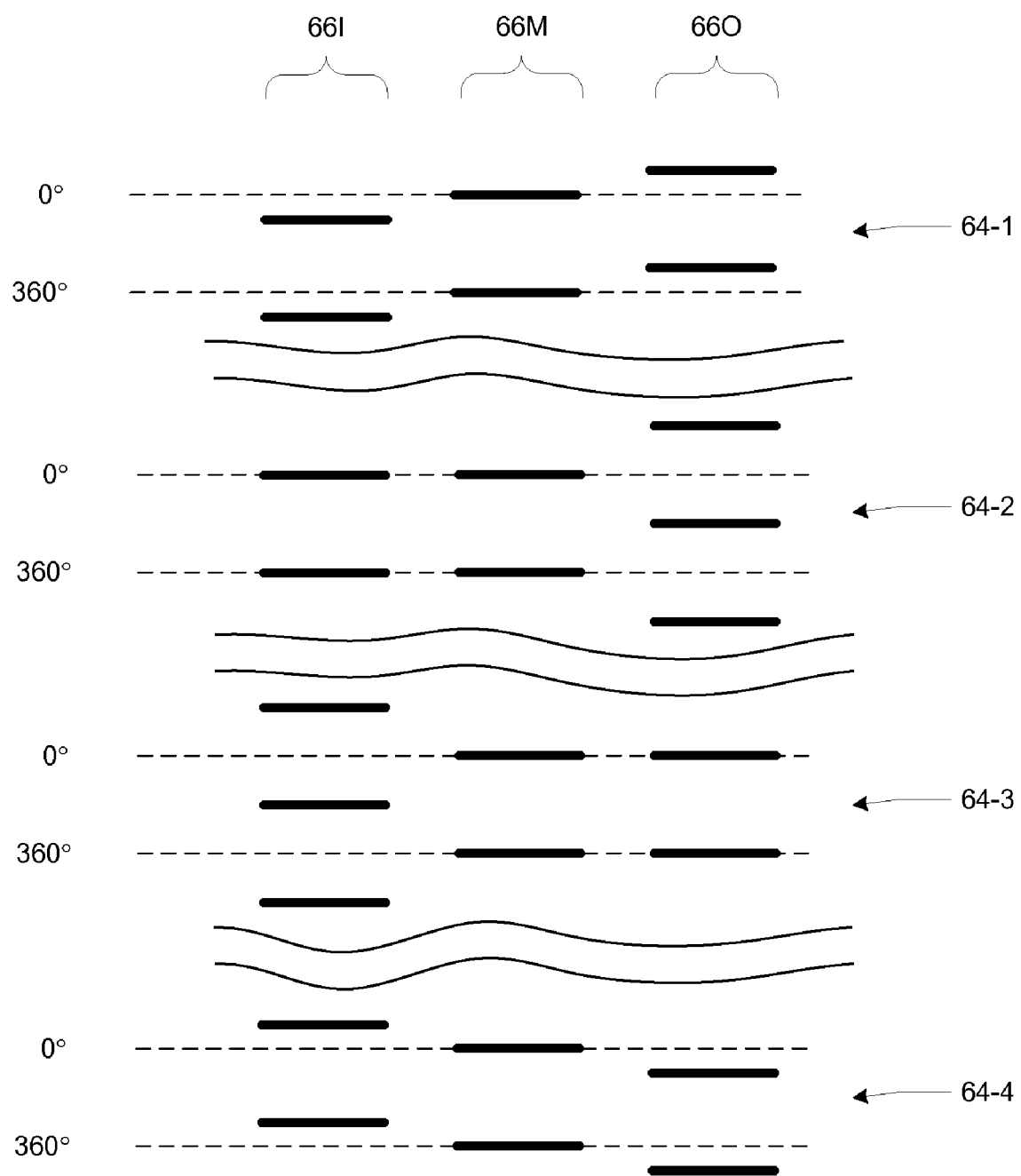
FIG. 8 is a diagram describing the relative phases of reticle apertures of the set of reticle aperture patterns of FIG. 7.

FIG. 8 illustrates the above specific scheme. The scale lines of the middle pattern 66M of reticle apertures are taken to be located at multiples of 360°. The lines of the reticle apertures 64-1 through 64-4 of the inner pattern 66I are shifted by 90°, 0°, 180°, and 270° respectively. The lines of the reticle apertures 64-1 through 64-4 of the outer pattern 66O are shifted by 270°, 180°, 0°, and 90° respectively.

FIG. 9 shows the detectors 52A, 52B of the incremental position sub-encoders 54A, 54B. Each detector 52 has two separate detector arrays 67 having four detectors each: a radially inner array 67I, and a radially outer array 67O. In the illustrated embodiment, each sub-encoder 54A, 54B actually has two optical sub-paths, one for each of the arrays 67I, 67O. An inner optical sub-path extends through the inner reticle aperture pattern 66I in an incident direction and the middle reticle aperture pattern 66M in a reflected direction, and terminates at inner detector array 67I. An outer optical sub-path extends through the middle reticle aperture pattern 66M in an incident direction and the outer reticle aperture pattern 66O in a reflected direction, and terminates at outer detector array 67O. These sub-paths are described in more detail below. As also described below, respective outputs of the arrays 67I and 67O are combined in an analog fashion to provide certain performance benefits for the optical encoder. It will be appreciated that for the inner optical path, four samples at spatial phases B, A, A– and B– respectively are obtained, and for the outer optical path, four samples at spatial phases B–, A–, A and B are obtained.

FIG. 10 illustrates the set of reticle aperture patterns 50C for the coarse absolute position sub-encoder 54C. It includes three rectangular reticle apertures 68I, 68M, and 68O. FIG. 11 shows the detector 52C, which includes an inner detector 69I and an outer detector 69O. As with the incremental position encoders 54A, 54B, the coarse absolute position sub-encoder 54C has both radially inner and radially outer optical sub-paths.

FIGS. 12a and 12b are schematic side views illustrating the two optical sub-paths for each of the sub-encoders 54A, 54B and 54C. FIG. 12a depicts the paths for the incremental sub-encoders 54A and 54B. Light from a source 46 travels in an incident direction through the inner and middle reticle aperture patterns 66I, 66M and is reflected by the respective scale optical pattern 48A or 48B of the scale disk 32. The reflected light travels in a reflected direction through the middle and outer reticle aperture patterns 66M, 66O to respective detector arrays 67 on the analog circuit board 40 (not shown in FIG. 12). FIG. 12b shows the paths for the coarse absolute sub-encoder 54C, which are similar to those for the incremental sub-encoders 54A, 54B. An opaque shield 70 is employed to prevent stray light from the source 46 reaching the detectors 67, 69 by other than the intended optical paths. In the illustrated embodiment, the shield 70 may be part of a generally cylindrical housing that encloses the light source assembly 36 (FIG. 3).

FIG. 13 illustrates the set of reticle aperture patterns 50D for the zero-reference sub-encoder 54D. It consists of four inner reticle apertures 72I and an outer reticle aperture pattern 72O. The inner reticle apertures 72I are formed as diffraction gratings similar to the reticle apertures 64 (FIG. 7), but with a coarser period corresponding to the period of coarse scale 58. The outer reticle aperture pattern 72O is a set of rectangular openings having width and spacing corresponding to those of the index pattern 56 (FIG. 6(b)).

FIG. 14 shows the detector 52D of the zero-reference sub-encoder 54D. It includes four inner detectors 73I and two outer detectors 73O. Like the sub-encoders 54A, 54B and 54C, the zero-reference sub-encoder 54D also has radially inner and outer optical sub-paths. The inner sub-path extends through the inner reticle apertures 72I to the inner detectors 73I, and the outer sub-path extends through the outer reticle apertures 72O to the outer detectors 73O. These paths are somewhat different from those of the other sub-encoders 54A, 54B and 54C shown in FIG. 12, as now described.

FIG. 15 illustrates in side schematic form the optical sub-paths for the zero-reference sub-encoder 54D. FIG. 15a shows the outer optical sub-path. Light from the source 46 travels in an incident direction through the outer reticle apertures 72O and is reflected by the index pattern 56 of the scale disk 32. The reflected light travels in a reflected direction back through the outer reticle apertures 72O to the respective outer detectors 73O on the analog circuit board 40 (not shown). FIG. 15b shows the inner optical sub-path. Light from the source 46 travels in an incident direction through the inner reticle apertures 72I and is reflected by the coarse scale pattern 58 of the scale disk 32. The reflected light travels in a reflected direction back through the inner reticle apertures 72I to the inner detectors 73I. The signals from the inner detectors 73I are used to gate the signals generated by the outer detectors 73O, such that the gated index signal has a known phase with respect to the fine track signal generated by the sub-encoders 54A, 54B. This gating takes place on the analog circuit board 40.

Figure 16:
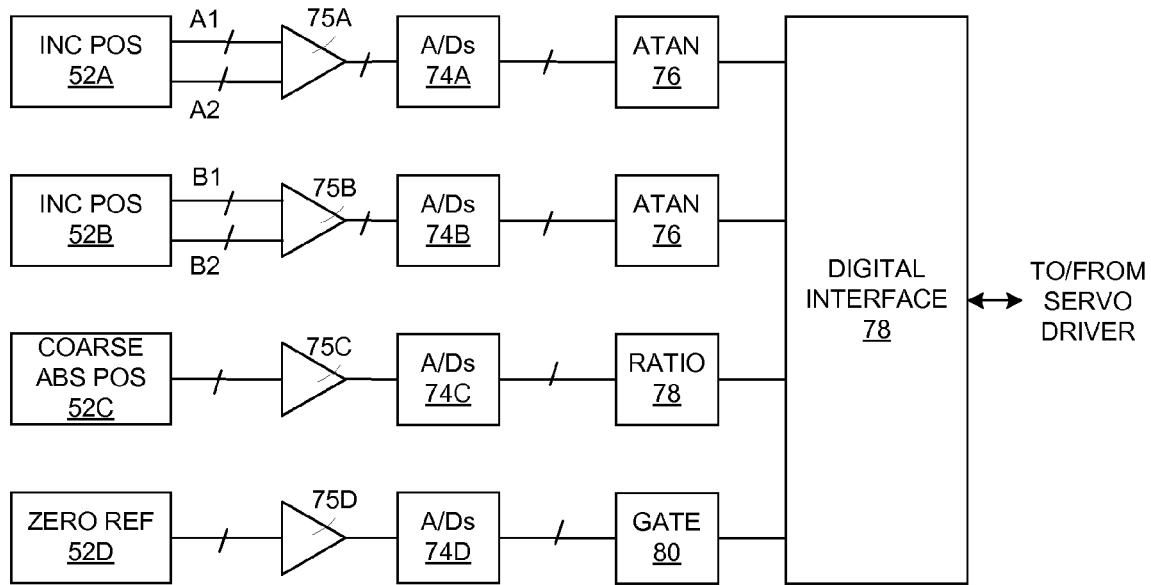
FIG. 16 is a block diagram of analog and digital circuitry appearing on respective circuit boards in the rotary optical position encoder of FIG. 3.

FIG. 16 is an electrical block diagram of the optical encoder of FIG. 3. The respective detectors 52 of the sub-encoders 54 are shown. Each sub-encoder 54 has associated analog-to-digital converters (A/D) 74, the respective outputs of which are sent to the digital board 42. For each of the incremental position sub-encoders 54A and 54B, there are two sets of 4-phase analog outputs, shown as A1/A2 and B1/B2. For each of the sub-encoders 54A and 54B, respective ones of these analog outputs are combined in an analog combining circuit (75A for sub-encoder 54A, and 75A for sub-encoder 54B). This combining may take the form, for example, of simply wiring the outputs of corresponding ones of the detector elements 67I and 67O together, or alternatively using amplifier circuitry in a summing arrangement. Each combined analog signal is digitized by a corresponding A/D converter 74, and the digitized samples are provided to arctangent calculation circuitry (ATAN) 76.

For the coarse absolute position sub-encoder 54C, there are two analog outputs, one from each of the detectors 69I, 69O (FIG. 11). These are converted to digital values in the A/Ds 74C and then the digitized signals are utilized by ratio circuitry (RATIO) 78 that implements the above-described (A−B)/(A+B) calculation to derive a coarse absolute position value.

For the zero-reference sub-encoder 54D, there are two sets of analog outputs, one for each of the detector arrays 73I and 73O (FIG. 14). These are converted to digital values by A/Ds 74D, and the digitized signals are utilized by gate circuitry (GATE) 80 to generate the above-described gated index signal that identifies the zero-reference position.

Figure 16A:
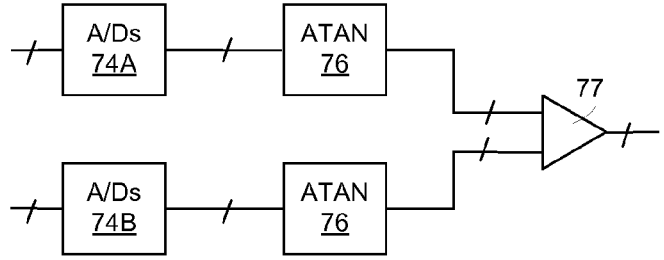
FIG. 16a is block diagram of an alternative configuration for a portion of the circuitry of FIG. 16.

The outputs of the circuits 76, 78 and 80 are provided to digital interface circuitry 78 which provides communication to an external servo driver responsible for controlling the rotational position of the rotatable shaft 34. In the illustrated embodiment, the servo driver digitally combines the arctangent values from the incremental position sub-encoders 54A and 54B, for example by taking an average value. In an alternative embodiment, the digital combining may be performed between the ATAN circuits 76 and the digital interface circuitry 78, as is shown in FIG. 16a.

The circuitry of FIG. 16 can be located on one circuit board or on multiple circuit boards as dictated by system goals. For an embodiment such as that of FIG. 3, it may be desirable to separate analog and digital circuitry between separate circuit boards 40, 42. When analog and digital circuitry are located on the same circuit board, it is desirable to employ separate ground/power planes in order to isolate the sensitive analog circuitry from electrical noise generated by the digital circuitry, as is generally known in the art.

Figure 17:
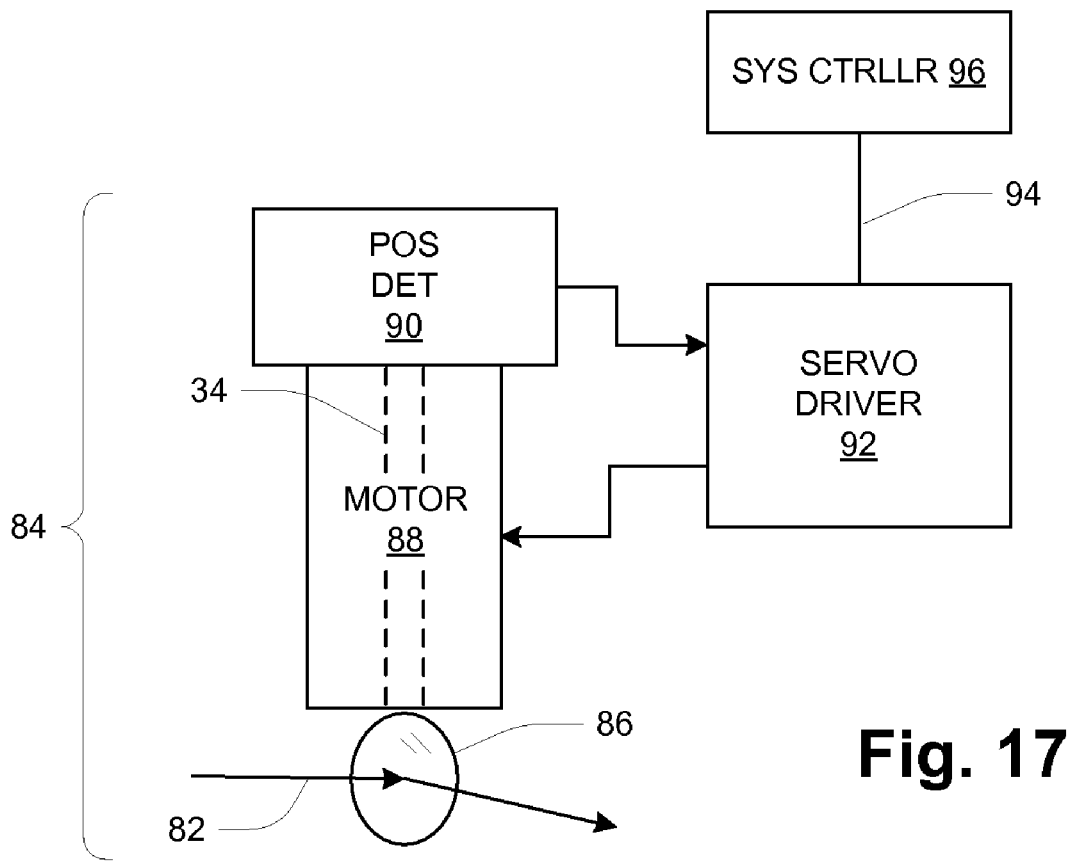
FIG. 17 is a block diagram of a laser-based system employing a servo-controlled galvanometer including the rotary optical position encoder of FIG. 3.

FIG. 17 is a block diagram of a laser system in which the optical encoder of FIG. 3 may be utilized. A laser beam 82 generated by a laser beam source (not shown) is steered by a galvanometer 84 which includes an optical element 86 (such as a mirror) mounted to a servo motor assembly consisting of a motor 88 and a position detector 90. The position detector 90 may be implemented using the optical encoder of FIG. 3, with the scale disk 32 being attached to the motor shaft 34. The output of the position detector 90 is provided to a servo driver 92 which provides the drive signals to the motor 88.

The servo driver 92 operates in response to a position command signal 94 from a system controller (SYS CTRLLR) 96. Based on the position commanded by the position command signal 94, the servo driver 92 employs closed-loop control of the motor 88 to bring the rotatable shaft 34 (and thereby the optical element 86 as well) to the commanded rotational position, as is generally known in the art.

Laser systems in which the disclosed optical encoder may be used include systems that perform laser material processing and systems that perform laser-based measurement or gauging, for example. Specific examples of laser material processing applications include laser-based marking, drilling, cutting, trimming, micromachining, sintering, and welding.

Figure 18:
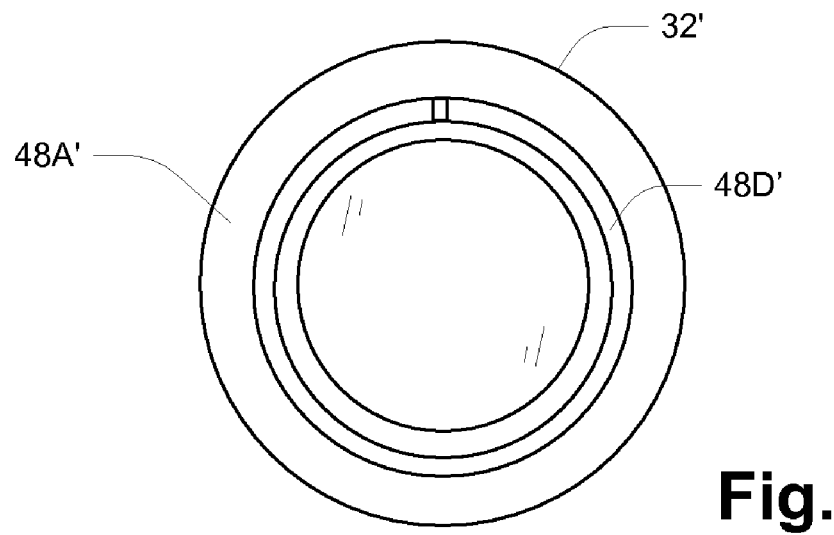
FIG. 18 is a diagram illustrating an alternative scale disk that may be used in the encoder of FIG. 1.

FIG. 18 shows a scale disk 32' that may be used in alternative embodiments involving full rotation of the object whose rotational position is being detected by the optical position encoder (in contrast to the limited rotation of a galvo such as described above). The scale disk 32' employs a scale pattern 48A' extending entirely around the circumference. In such an embodiment, it will be appreciated that each sub-encoder such as sub-encoders 10A, 10B interact with the one scale pattern 48A', albeit at different locations thereof at any given rotational position. An index and coarse position track 48D' can be located inwardly of the scale pattern 48A' as shown. Alternatively, the index and coarse position track 48D' can be located outwardly of the scale pattern 48A'. Either of these embodiments are alternatives to embodiments such as described above in which the scale pattern 48A and the index and coarse position track 48D are separated in the angular direction (e.g., different quadrants).

While the invention has been particularly shown and described with references to preferred embodiments thereof, it will be understood by those skilled in the art that various changes in form and details may be made therein without departing from the spirit and scope of the invention as defined by the appended claims. In particular, although in the illustrated embodiment a reflective scale disk 32 is employed, in alternative embodiments it may be desirable to employ a transmissive scale disk 32 with corresponding changes to the locations of the outer reticle aperture patterns (corresponding to patterns 66M and 66O for example) and detectors 52.

In other alternative arrangements, the index pattern could be a Fresnel zone lens, a single pulse geometric construction (shutter action), autocorrelation of geometric pulses or diffractive zone lenses (circular or cylindrical), etc. Other alternatives may use a high-resolution absolute position sub-encoder in place of the incremental and coarse absolute position sub-encoders shown above. An exemplary encoder of this type is shown in US Published Patent Application No. 20050133705 entitled "Absolute Encoder Employing Concatenated, Multi-Bit, Interpolated Sub-Encoders". As also shown in that application, other techniques may also be employed such as using a ramp function (either ratiometric or push-pull), grayscale patterns (e.g. dot matrix, diffractive or tailored micro-diffusers), focused line-of-light (Fresnel zone lens) ramping across the detector, etc. Additionally, alternative embodiments may employ only one detector array and optical sub-path rather than two radially-separated arrays and sub-paths as described above. In such alternative embodiments, the set of reticle aperture patterns for each incremental sub-encoder may require only two reticle apertures patterns rather than three as shown in the above description.

What is claimed is:

1. A rotary optical position encoder for detecting angular position about a rotational axis, comprising:
   a light source;
   a monolithic scale disk including an optical scale pattern;

a monolithic reticle substrate between the light source and the scale disk, the reticle substrate including a plurality of sets of reticle aperture patterns;

detection and conversion circuitry; and digital processing circuitry coupled to the detection and conversion circuitry, wherein:

the light source, scale disk, reticle substrate, and detection and conversion circuitry are configured to form a plurality of optical sub-encoders at respective angular positions about the rotational axis, each sub-encoder having a respective optical path extending from the light source to the detection and conversion circuitry via a respective set of reticle aperture patterns of the reticle substrate and the optical scale pattern of the scale disk, each sub-encoder generating a respective digital position output value, the plurality of sub-encoders including two incremental position sub-encoders, and the digital processing circuitry is operative to combine the digital position output values of the sub-encoders to generate an encoder position output value, the combining including calculating an average of the respective digital position output values of the two incremental position sub-encoders.

2. A rotary optical position encoder according to claim 1, wherein:

the range of angular position detected by the optical position encoder is less than one-half of a complete revolution;

the optical scale pattern comprises two scale portions at respective spaced-apart angular positions of the scale disk;

the scale disk includes an optical position reference pattern between the two scale portions; and the scale disk, reticle substrate, light source, and detection and conversion circuitry are further configured to form a reference optical sub-encoder, the reference optical sub-encoder including a reference reticle aperture pattern formed on the reticle substrate along an optical path of the reference optical sub-encoder between the light source, the optical position reference pattern of the scale disk, and the detectors.

3. A rotary optical position encoder according to claim 2, wherein:

the optical position reference pattern of the scale disk comprises a zero-reference pattern at a location corresponding to a zero-reference position;

the reference reticle aperture pattern of the reticle substrate is a zero-reference reticle aperture pattern; and the reference optical sub-encoder is a zero-reference optical sub-encoder configured to utilize the zero-reference pattern of the scale disk and the zero-reference reticle aperture pattern of the reticle substrate to detect whether the optical position encoder is at the zero-reference position.

4. A rotary optical position encoder according to claim 2, wherein:

the optical position reference pattern of the scale disk comprises a coarse absolute position pattern configured to indicate a coarse absolute position of the optical position encoder;

the reference reticle aperture pattern of the reticle substrate is a coarse absolute position reticle aperture pattern; and the reference optical sub-encoder is a coarse absolute position optical sub-encoder configured to utilize the coarse absolute position pattern of the scale disk and the coarse absolute position reticle aperture pattern of the reticle substrate to detect the coarse absolute position of the optical position encoder.

5. A rotary optical position encoder according to claim 4, wherein:

the coarse absolute position pattern of the scale disk is further configured to indicate the magnitude and direction of angular displacement away from the zero-reference position; and the coarse absolute position optical sub-encoder is further configured to utilize the coarse absolute position indicating pattern of the scale disk and the coarse absolute position reticle aperture pattern of the reticle substrate to detect the magnitude of the angular displacement of the optical position encoder from the zero-reference position.

6. A rotary optical position encoder according to claim 4, the scale disk includes a zero-reference pattern between the two scale portions at a location opposite coarse absolute position pattern; and the light source, scale disk, reticle substrate, and detection and conversion circuitry are further configured to form a zero-reference optical sub-encoder between two of the optical sub-encoders at a location diametrically opposite the coarse absolute position optical sub-encoder, the zero-reference optical sub-encoder including a zero-reference reticle aperture pattern formed on the reticle substrate along an optical path of the zero-reference sub-encoder between the light source and the zero-reference pattern of the scale disk, the zero-reference optical sub-encoder being configured to utilize the zero-reference pattern of the scale disk and the zero-reference reticle aperture pattern of the reticle substrate to detect whether the optical position encoder is at the zero-reference position.

7. A rotary optical position encoder according to claim 1, wherein:

the optical pattern of the scale disk is a reflective optical scale pattern such that the optical path of each of the optical sub-encoders includes a reflected portion;

each of the sets of reticle aperture patterns of the reticle substrate includes first reticle aperture patterns and second reticle aperture patterns, the first reticle aperture patterns lying along the reflected portion of a first optical sub-path of a respective one of the optical sub-encoders, and the second reticle aperture patterns lying along the reflected portion of a second optical sub-path of a respective one of the optical sub-encoders; and each of the optical sub-encoders further includes respective first and second optical detectors each lying along the reflected portion of a respective optical sub-path of the optical sub-encoder to receive light traveling through the respective reticle aperture patterns.

8. A rotary optical position encoder according to claim 7, wherein the first and second reticle aperture patterns of each of the sub-encoders include a respective shared reticle aperture pattern through which light travels both (1) in an incident direction from the source toward the scale disk, and (2) in a reflected direction from the scale disk toward the respective optical detector.

9. A rotary optical position encoder according to claim 8, wherein:

the first and second reticle aperture patterns of each of the optical sub-encoders includes an inner aperture pattern, a middle aperture pattern, and an outer aperture pattern, the middle pattern being the shared reticle aperture pattern, each aperture pattern including multiple reticle apertures;

each optical sub-encoder is configured such that (1) light traveling in the incident direction through the inner aperture pattern is reflected from the scale disk so as to travel primarily through the middle aperture pattern in the reflected direction, and (2) light traveling in the incident direction through the middle aperture pattern is reflected from the scale disk so as to travel primarily through the outer pattern in the reflected direction;

the reticle apertures of the inner and outer aperture patterns are configured with a common spatial phase; and the reticle apertures of the middle aperture pattern are configured with respective different spatial phases.

10. A rotary optical position encoder according to claim 7, wherein the scale disk is affixed at an axial end of a rotatable shaft coaxial therewith, and an optical encoder assembly faces the scale disk coaxial with the rotatable shaft, and wherein:

the light source is housed within a light source assembly including an opaque housing affixed to the reticle substrate; and the optical encoder assembly comprises a circuit board on which the optical detectors are located, the circuit board surrounding the opaque housing and being spaced apart from the reticle substrate in the direction away from the rotatable shaft.

11. A rotary optical position encoder according to claim 1, wherein the light source comprises multiple discrete light sources, each discrete light source providing light for only a respective one of the optical sub-encoders.

12. A rotary optical position encoder according to claim 1, wherein the light source comprises one or more discrete light sources, each discrete light source being selected from the group consisting of (light-emitting diodes, semiconductor lasers, quantum devices, incandescent sources, and fluorescent sources).

13. A rotary optical position encoder according to claim 1, wherein each of the optical sub-encoders includes multiple analog position values generated within the detection and conversion circuitry, and wherein the detection and conversion circuitry includes (1) analog combining circuitry configured to combine respective analog position values of each of the optical sub-encoders to generate sub-encoder analog position output values; and (2) analog-to-digital conversion circuitry configured to generate the digital position output value of each of the sub-encoders from the analog position output values.

14. A rotary optical position encoder according to claim 13, wherein the digital processing circuitry is operative to combine the digital position output values of the sub-encoders to generate an encoder position output value.

15. A rotary optical position encoder according to claim 1, wherein the number of the optical sub-encoders is two and the two optical sub-encoders are located at diametrically opposite positions about the rotational axis.

16. A rotary optical position encoder according to claim 1, wherein the optical position sub-encoders are equally spaced about the rotational axis.

17. A rotary optical position encoder according to claim 1, wherein the reticle substrate and the scale disk are of the same material.

18. A rotary optical position encoder according to claim 17, wherein the material is glass.

19. A rotary optical position encoder according to claim 1, wherein:

the scale disk includes an optical position reference pattern radially spaced from the scale portions; and the scale disk, reticle substrate, light source, and detection and conversion circuitry are further configured to form a reference optical sub-encoder, the reference optical sub-encoder including a reference reticle aperture pattern formed on the reticle substrate along an optical path of the reference optical sub-encoder between the light source, the optical position reference pattern of the scale disk, and the detectors.

20. A rotary optical position encoder according to claim 19, wherein:

the optical position reference pattern of the scale disk comprises a zero-reference pattern;

the reference reticle aperture pattern of the reticle substrate is a zero-reference reticle aperture pattern; and the reference optical sub-encoder is a zero-reference optical sub-encoder configured to utilize the zero-reference pattern of the scale disk and the zero-reference reticle aperture pattern of the reticle substrate to detect whether the optical position encoder is at the zero-reference position.

21. A servo motor assembly, comprising:

a servo motor having a motor shaft rotatable about the rotation axis; and the rotary optical position encoder of claim 1 located at one end of the rotatable servo motor shaft and configured to detect the rotational position thereof.

22. A servo-controlled galvanometer for use in directing an incident laser beam in a selected direction, comprising:

the servo motor assembly of claim 21; and an optical element coupled to the other end of the rotatable servo motor shaft and configured to lie along a path of the incident laser beam.

23. A laser system, comprising:

a source of a laser beam;

the servo-controlled galvanometer of claim 22;

a servo driver configured to control the angular position of the rotatable servo motor shaft of the servo motor assembly in response to a position command signal; and a system controller operative to generate the position command signal to direct the laser beam in a desired fashion.

24. A laser system according to claim 23, being configured for a use in at least one of laser material processing and laser measurement.

25. A rotary optical position encoder for detecting angular position of a rotatable object about a rotational axis, comprising:

a reflective monolithic scale disk including optical scale patterns, the scale disk being mounted to the rotatable object;

a monolithic reticle substrate adjacent to the scale disk, the reticle substrate including a plurality of sets of reticle aperture patterns;

a light source assembly affixed to the reticle substrate and including one or more light sources operative to direct light through the reticle aperture patterns of the reticle substrate to the optical scale patterns of the scale disk;

detection and conversion circuitry; and digital processing circuitry coupled to the detection and conversion circuitry, wherein:

the light source, scale disk, reticle substrate, and detection and conversion circuitry are configured to form a plurality of optical sub-encoders in respective quadrants about the rotational axis, the sub-encoders including (i) a pair of incremental position sub-encoders at diametrically opposite positions, (ii) a zero-reference sub-encoder, and (iii) a coarse absolute position encoder, each sub-encoder being a reflective optical sub-encoder having a respective optical path extending from the light source to the detection and conversion circuitry via respective sets of reticle aperture patterns of the reticle substrate and the optical scale pattern of the scale disk, each sub-encoder having a respective digital position output value, and the digital processing circuitry is operative to combine the digital position output values of the sub-encoders to generate an encoder position output value, the combining including calculating an average of the respective digital position output values of the two incremental position sub-encoders.

26. A rotary optical position encoder according to claim 1, wherein each of the incremental position sub-encoders is arranged as a polyphase diffraction grating position detector.

27. A rotary optical position encoder according to claim 26, wherein each of the incremental position sub-encoders is a four-phase position detector configured to (i) obtain samples at spatial phases of 0, 90, 180 and 270 degrees of an optical fringe period, and (ii) calculate a spatial phase value by applying an inverse trigonometric function to the samples.

28. A rotary optical position encoder according to claim 26, wherein:
 the optical pattern of the scale disk is a reflective optical scale pattern such that the optical path of each of the optical sub-encoders includes a reflected portion;
 each of the sets of reticle aperture patterns of the reticle substrate includes first reticle aperture patterns and second reticle aperture patterns, the first reticle aperture patterns lying along the reflected portion of a first optical sub-path of a respective one of the optical sub-encoders, and the second reticle aperture patterns lying along the reflected portion of a second optical sub-path of a respective one of the optical sub-encoders; and
 each of the optical sub-encoders further includes respective first and second optical detectors each lying along the reflected portion of a respective optical sub-path of the optical sub-encoder to receive light traveling through the respective reticle aperture patterns.

\* \* \* \* \*